United States Patent
Rhoades

(10) Patent No.: US 6,173,372 B1
(45) Date of Patent: Jan. 9, 2001

(54) PARALLEL PROCESSING OF DATA MATRICES

(75) Inventor: John R. Rhoades, Carrboro, NC (US)

(73) Assignee: Pixelfusion Limited, Bristol (GB)

( * ) Notice: Under 35 U.S.C. 154(b), the term of this patent shall be extended for 0 days.

(21) Appl. No.: 09/026,368

(22) Filed: Feb. 19, 1998

(30) Foreign Application Priority Data

Feb. 20, 1997 (GB) .................................................. 9703565

(51) Int. Cl.$^7$ .................................................. G06F 12/00
(52) U.S. Cl. .......................................... 711/147; 711/117
(58) Field of Search .................................. 711/147, 117; 345/505, 526

(56) References Cited

U.S. PATENT DOCUMENTS

| | | | |
|---|---|---|---|
| 5,481,669 | * | 1/1996 | Poulton et al. ....................... 395/505 |
| 5,539,898 | * | 7/1996 | Trevett et al. ....................... 711/167 |
| 5,584,010 | * | 12/1996 | Kawai et al. ......................... 711/117 |

OTHER PUBLICATIONS

Paper presented at proceedings of Siggraph 92, Computer Graphics 26, Jul. 2, 1992, pp. 231–140 entitled PixelFlow: High–Speed Rendering Using Image Composition.

Article entitled "Survey of Texture Mapping" published 1986 IEEE pgs. 56–67.

* cited by examiner

*Primary Examiner*—John W. Cabeca
*Assistant Examiner*—Brian R. Peugh
(74) *Attorney, Agent, or Firm*—Seyfarth Shaw

(57) ABSTRACT

A method of controlling first and second processing elements which have associated respective first and second address memories, and associated respective first and second data memories, the method comprising storing first and second pluralities of address entries in the first and second address memories respectively, exchanging a pre-determined number of address entries between the first and second address memories, retrieving data entries from a common data store on the basis of the address entries held in the first address memory, storing the retrieved data entries in the first data memory, and exchanging the pre-determined number of data entries between the first and second data memories, such that the first data memory includes data entries corresponding to the address entries stored in the first address memory, and such that the second data memory includes data entries corresponding to the address entries stored in the second address memory.

2 Claims, 2 Drawing Sheets

○ = PIXEL    ● = TEXEL

ODD MIP-MAP LEVELS    EVEN MIP-MAP LEVELS

PARALLEL PROCESSING OF DATA MATRICES

TECHNICAL FIELD

The invention relates to the parallel processing of data matrices, such as images, e.g., in computer graphics or video systems which employ SIMD (single instruction multiple data) arrays of processor elements.

BACKGROUND OF THE INVENTION

The focus in this review of background art is on real-time computer graphics systems. However, no corresponding limitation of the scope of the invention is intended.

The range of technologies employed in computer graphics systems is well summarised in books such as "Computer Graphics: Principles and Practices", J. D. Foley et al., Addison-Wesley, 1990. These also present valuable summaries of the various uses to which such systems have been and may be put. In a typical system, a task might be to present a two dimensional projection of a three dimensional model held in computer memory. Complex objects in the model are constructed from more basic components such as flat polygons. Each of these components has aspects of its position, appearance, and behaviour defined by a set of numbers. Constructing a two dimensional projection of the model is termed rendering. The rendered image might be displayed on a computer monitor, for example. In an interactive system, the renderer must generate not isolated images but a rapid succession of related frames.

Graphics rendering schemes generally include separate "Rasterization" and "shading" processes. Rasterization determines which parts of the model contribute directly to which pixels (picture elements) of the image. The shading process then "paints in" the contributions of the those parts. The degree of realism achieved in the final image depends very much on the behaviour of shading algorithm. One popular technique for improving the accuracy or richness of rendered images is called texture mapping, see for example "Survey of Texture Mapping," P.S. Heckbert, IEEE Computer Graphics and Applications, v6.11, p56–67, November 1986, or U.S. Pat. No. 5,490,240: "System and method of generating interactive computer graphic images incorporating three dimensional textures," J. L. Foran et al., Silicon Graphics.

In this technique the model has data-sets added which can be used to define surface detail. A typical data-set might be a pattern of bricks to tile onto a wall or a user's photograph to personalise a mannequin. The business of reading texture data from shared memory into the image is part of the shading process.

Texture mapping is in part a re-sampling operation, because the texture sample grids and screen pixel grids do not tend to line up. Practical systems use interpolation to keep the re-sampling errors acceptably small. Anti-aliasing artifacts are commonly avoided by making multiple copies of the textures available, each one having a different resolution. These multi-resolution data-sets are called MIP-maps (where MIP stands for multum in parvo, multiple image pyramid, or similar). With bilinear interpolation, texture values are calculated as linear weightings of the four closest texels (texture elements), as indicated in FIG. 1 of the accompaning drawings. The texels are taken from MIP-map levels which are chosen, on a per pixel basis, to give an acceptable compromise between too much aliasing and too much blurring. In a simple implementation, bilinear interpolation uses four times as many texel lookups as point sampling does. Many high-quality renderers use trilinear interpolation, which demands eight texels per pixel. Four of these are taken from one MIP-map level, and the other four from an adjacent level. This allows blur banding effects to be avoided.

The phrase "texture mappings", can refer to a wide range of rendering operations, including bump mapping, environment mapping, image resampling, lightsource mapping, and others.

However, there are many other data matrix processing tasks which also involve re-sampling and which hence share the need for fast interpolation. One such is motion-vector-based video processing. See for example U.S. Pat. No. 5,396,592: "Image signal interpolating circuit for calculating interpolated values for varying block sizes", T. Fujimoto, Sony.

To address the problem of aliasing at polygon edges, supersampling is often employed. With "four times" supersampling, each final-image pixel receives contributions from four separately rasterized sub-pixels. The word "pixel", used casually, often refers not just to final-image pixels but to sub-pixels as well.

The problem of how to achieve adequate texture bandwidth is a persistent one in graphics system design. One strategy is to deter the shading, for any given region of screen space, until the rasterization of that region has finished. In this way, polygons and parts of polygons which turn out to be obscured in the final image do not ever get shaded. Another measure which can be taken, is to hold copies of recently fetched texels in a cache. It should be apparent from FIG. 1 that this can cut the number of main-memory lookups by a significant factor.

High performance renderers necessarily rely on parallel processing techniques. Significantly, an increasing number of new designs are using the SIMD (single instruction multiple data) approach to parallelism, in which the individual processor elements (PEs) operate in lockstep from a common instruction stream. The PixelFlow system is one such design "PixelFlow: High-Speed Rendering Using Image Composition", S. Molnar, J. Eyles and J. Poulton, Computer Graphics, v26.2 (SIGGRAPH '92 Conference Proceedings), p231–240, July 1992. A small PixelFlow system might have 16 array chips, each containing 256 PEs. It would typically tackle the rendering task region by region, the regions being of a size which allocates one PE to each pixel.

Single instruction multiple data (SIMD) arrays intended specifically for graphics rendering tend to have quite limited facilities for interprocessor communications, compared for example to "systolic" arrays. However, a basic facility is often provided, for example to support the sub-pixel merging process in applications which demand supersampling.

Texel caching has been used to advantage in some MIMD (multiple instruction multiple data) arrays. However, none of the standard cache implementation architectures maps sensibly into the SIMD case. This is largely because of the pipelining which is a necessary feature of SIMD array memory subsystems.

The PixelFlow shared-memory subsystem serves as a good example of current art. Since the PEs act in lockstep, they must all wait for every one of any given set of texture reads to have completed before they attempt to use the data. The memory accesses are, in effect, heavily pipelined. Eight banks of memory are provided, each individually addressable. The default strategy is to allocate texels to banks according to the numbering of FIG. 2. This allows eight texels to be fetched for trilinear interpolation in one parallel read.

Importantly, the PixelFlow system does include a mechanism for making texture lookups conditional on whether PEs do or do not need data. To see the value of this, consider the rasterization and texturing of a single triangle. After rasterization, each PE knows whether it is inside or outside of the triangle's perimeter. The mechanism means that no texture lookups need to take place for PEs which are outside the triangle. This basic step away from full determinism sets the state of the art in SIMD graphics memory subsystems.

SUMMARY OF PRESENT INVENTION

According to a first aspect of the present invention, there is provided a data matrix processing device which includes a SIMD array of processor elements, a shared memory block to which the processor elements have common read access, and control and/or communications means, the control means being configured to enable the read accesses in general, and texture lookups in particular, to be shared between multiple processor elements or processes.

According to a second aspect of the invention, there is provided a system for enabling the look up of two quartets, these being destined for interpolation on two different processor elements. This constitutes a sharing by two PEs of one parallel texture lookup operation. To avoid blocking, i.e. to make sure that every PE can still see all the texture, the texture data is duplicated in the two halves of memory.

This scheme can be used not only with bilinear interpolation but also with other four-into-one algorithms, and even with trilinear interpolation. In the trilinear case the required octets of texels have to be fetched as two quartets in two separate lookup operations. The fact that the granularity is four, compared with eight for the standard configuration, can bring advantages. We note that the approach of the current aspect can be extended to give a granularity of two, or even of one, with the penalty being further duplication of the texture data.

In the circumstances outlined under the second aspect, it may be that the renderer hardware is incapable of sourcing the addresses for a single parallel read from more than one PE. Similarly, the hardware may not be able to distribute the texels from a single read between multiple destination PEs. According to the invention in a third aspect, interprocessor communications are used to sidestep this problem. Some of the PEs combine the addresses of the texels which they need with addresses received, via a communications path, from other PEs. The shared lookups can then proceed. When the quartets of texels have been returned to the PEs which instigated the lookups, it remains only to post some of them on to their desired destination PEs. Again, this is done using interprocessor communications.

In supersampling systems, interprocessor communications are necessarily used to merge sub-pixel data. We can therefore identify a set of schemes which aim to share texture lookups between sub-pixels of the same pixel as comprising a particularly important set. This is partly because the support for such schemes is effectively already in place, for the anti-aliasing.

By way of example, consider a supersampling system in which the data from the sub-pixels is brought together onto a single PE not after shading but before. This data can easily include the texel addresses. These can be compared and, where possible, edited down before the lookups are invoked. Note that it is not necessary in this example to copy any texels between processors. In this case, when texels are shared it is by being copied to multiple subprocesses on their destination PE. This makes the reliance of the scheme on interprocessor communications a little less obvious. However, the reliance is still there. This is because the addresses are calculated on multiple PEs and must then be brought together onto a single PE.

In supersampling systems, there is yet another way of saving texture lookups. Its first step is to identify, in each pixel, any sub-pixels which share a common texture. Let us say that two such sub-pixels are found. The next step is to merge their texture map pointers, by averaging or a similar process. (To illuminate this, we note that the integer parts of a texture map pointer determine which texels are fetched, and the fractional parts determine how those texels are weighted.) Then, instead of doing two lookups and two interpolations, we use the new texture map pointer and do just one lookup and one interpolation. The technique works because, in the body of a texture, anti-aliasing can be done by MIP-mapping on its own. The technique can be combined with other measures, such as reversion to point-sampled texture lookups for those sub-pixels which do not share a texture with other sub-pixels in their pixel.

According to another aspect of the present invention, there is provided a method of controlling first and second processing elements which have associated respective first and second address memories, and associated respective first and second data memories, the method comprising storing first and second pluralities of address entries in the first and second address memories respectively, exchanging a pre-determined number of address entries between the first and second address memories, retrieving data entries from a common data store on the basis of the address entries held in the first address memory, storing the retrieved data entries in the first data memory, and exchanging the pre-determined number of data entries between the first and second data memories, such that the first data memory includes data entries corresponding to the address entries stored in the first address memory, and such that the second data memory includes data entries corresponding to the address entries stored in the second address memory.

According to another aspect of the present invention, there is provided a data processing system comprising first and second processing elements, first and second memories associated respectively with the first and second processing elements, a common memory for storing working data for access means for storing address data in the first and second memories associated respectively with the first and second processing elements, a common memory for storing working data for access by the first and second processing elements, address means for storing address data in the first and second memories, exchange means for exchanging a predetermined amount of address data between the first and second memories and retrieved means for retrieving working data from the common memory on the basis of address data stored in the first memory and for storing that working data in the first memory, the exchange means also being operable to exchange such stored working data from the first memory to the second memory.

DESCRIPTION OF THE PREFERRED EMBODIMENT

The system according to the invention described here relates to a method of eliminating redundant texture storage accesses by sharing texels among neighboring processing elements PE's in a suitable SIMD architecture for a 3D graphics engine. The basic requirements for the architecture are described below. It relates to those applications of such systems in which the various processor elements require common access to data which has been stored in shared memory. In image generator systems used for visualisation, training, entertainment etc., it relates to the acceleration of pixel shading operations. More particularly, it relates to operations, such as texture mapping, which require the interpolation of stored data-sets.

Figure 3:
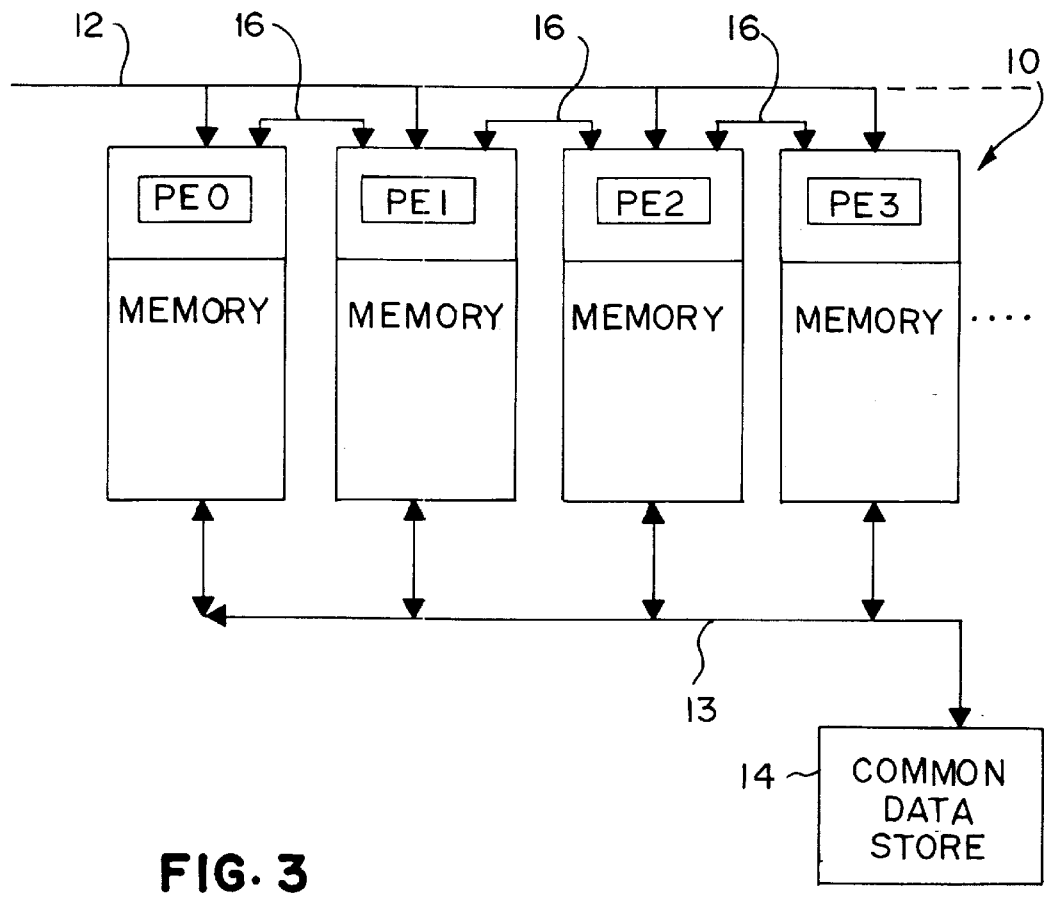
FIG. 3 shows a block diagram of a system according to the present invention.

Referring to FIG. 3, the architecture comprises an array 10 of PE's (processing elements) PE0, PE1, PE2, etc. that perform in parallel instructions from a single instruction stream. This array 10 is connected to a common texture store 14. PE's generate requests (texel addresses) for texture lookups, and these requests are serialized and presented to the external texture memory via a texel channel 13. The results from the requests, namely the texels, are serially returned to the requesting PE's. The texture memory is organized as multiple banks (typically eight banks), and the PE's request texels from all banks in parallel. Each PE has a single bit that controls whether or not it will participate in a texture lookup.

The PE's have the ability to exchange data in parallel. The PE's are linearly connected in groups of called panels. This invention does not depend on a specific panel size, and it will work for any panel size greater than one however, larger panels give more opportunity to eliminate texture lookups. Within a panel, a PE can send or receive data from its left or right neighbour via communication channels 16. This communication, sometimes called "swazzling", takes place in parallel for all PE's in the array.

The PixelFusion Ltd. VPF4000 graphics engine and the VPF2000 are existing implementations of this architecture. These are both derived from the PixelFlow architecture. In the PixelFlow design, there are 256 PE's per chip, connected as 8 panels each containing 32 PE's. Multiple chips are operated in parallel, 16 chips for the SVPF and 8 chips for the FUZION-2K.

The invention provides a way of controlling the array of PE's to reduce the number of accesses to the texture memory 14. When considering the invention, there is a trade-off to be made: more complex programs give greater reduction in the number of texture accesses, but take more cycles to execute. At a certain point, the increased execution overhead outweighs the savings due to reduced texture lookups.

In its simplest form, the goal is to perform a bilinear texture re-sampling for up to two textures at each PE in the array. This represents the case of two sample, dominant surface shading. In dominant surface shading, two of four subpixel samples are selected and shaded to produce an anti-aliased image. A given PE will actually require shading of two samples when the boundary between two different surfaces falls within its pixel area - statistically this is an unlikely event. Since most of the scene is typically textured, most PE's will have at least one texture lookup to perform. Measurements have been taken that indicate the expected number of surfaces that intersect a given pixel is in the order of 1.2 for typical applications.

Figures 1, 2:
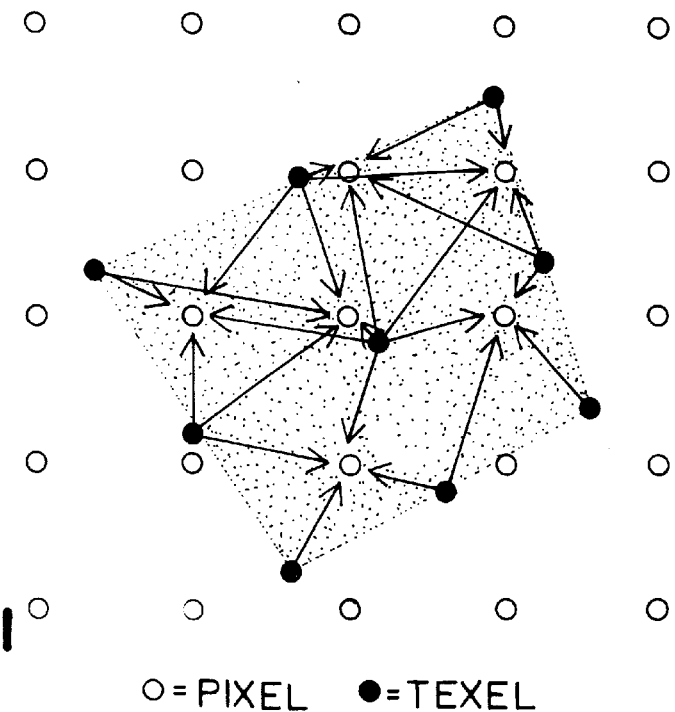
FIG. 1 illustrates texel to pixel mapping.
FIG. 2, illustrates texel allocation in a previously-considered system.
Figure 4:
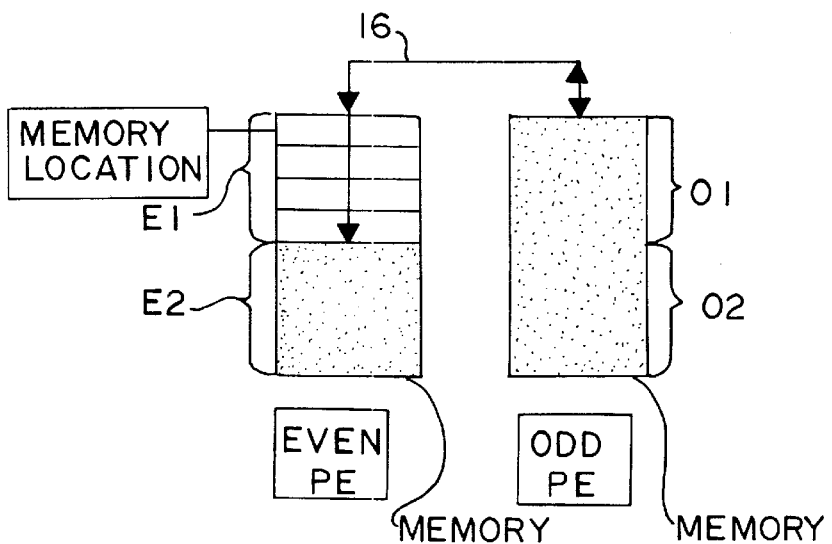
FIG. 4 illustrates memory provision in a system according to the present invention.

Consider the situation in which the graphics processing has reached the point where the PE's are ready to do texture lookups. Each PE will have up to two textures to look up, and each texture requires four texels to be fetched from texture store, as described with reference to FIG. 1. Let the PE's be labelled even or odd. In a system of the invention each even-numbered PE uses the local, parallel communication channel 16 to exchange the four addresses of its second texture with the four addresses of its odd-numbered neighbour PE's first texture (see FIG. 4).

After this exchange, each even-numbered FE will have the addresses of its own first texture and its odd-numbered neighboring PE's first texture. Each odd-numbered PE will have the addresses of its own second texture and its even-numbered neighboring PE's second texture. At this point, the PE's that do not need to look up a second texture (which as noted above, is typically 80% of the PE's) turn off their enable bit. This means that most of the odd numbered PE's will not participate in the texture lookup, causing a large reduction in the total number of texture store accesses. Without this exchange, almost every PE would have participated in the texture store access, so the savings approaches 50%. In the specific systems mentioned earlier, the resulting savings from doing fewer texture accesses is far greater than the extra overhead of performing the exchanges of addresses. After the texture lookup, the even and odd-numbered PE's exchange the texels they received, so that the texels end up in the proper PE's for the bilinear interpolation.

This technique can be elaborated to work with larger groups of communicating PE's. Consider the case of groups of eight communicating PE's. These PE's exchange data via the local communications channel to sort their texture addresses and remove duplicates. There will in general be many duplicates, because the PE's are assigned to adjacent screen pixels. Originally, each PE had four or eight texel addresses to look up, depending on whether it found one or two surfaces within its pixel area. All the texel addresses among the eight PE's are sorted, and duplicates are removed. After the sort, there will typically be fewer addresses to look up. These can be placed on the first few, say two or three, PE's of each group of eight. Only these two or three PE's will participate in the texture lookup, with the result that the number of lookups is only one fourth or three-eight's as many as required by the simplest method.

On the VPF4000 and VPF2000 systems mentioned earlier, the extra instruction cycles required to implement the group-of-eight method negates the savings due to reduced number of texture accesses. Future generations of the SIMD architecture will see the speed of the PE's increasing faster than the speed of texture accesses yielding a net performance increase.

What is claimed is:

1. A method of controlling first and second processing elements which have associated respective first and second address memories, and associated respective first and second data memories, the method comprising storing first and second pluralities of address entries in the first and second address memories respectively, exchanging four address entries between the first and second address memories, retrieving eight data entries from a common data store on the basis of the address entries held in the first address memory, the data entries being for interpolation by the processing elements, storing the retrieved data entries in the first data memory, and exchanging four data entries between the first and second data memories, such that the first data memory includes data entries corresponding to the address entries stored in the first address memory, and such that the second data memory includes data entries corresponding to the address entries stored in the second address memory.

2. A method of controlling first and second processing elements which have associated respective first and second address memories, and associated respective first and second data memories, the method comprising storing first and second pluralities of address entries in the first and second address memories respectively, exchanging a predetermined number of address entries between the first and second address memories, retrieving data entries from a common data store on the basis of the address entries held in the first address memory, storing the retrieved data entries in the first data memory, retrieving data entries from the common data store on the basis of the address entries held in the second address memory and storing them in the second data memory, and then exchanging the predetermined number of data entries between the first and second data memories, such that the first data memory includes data entries corresponding to the address entries stored in the first address memory, and such that the second data memory includes data entries corresponding to the address entries stored in the second address memory.

* * * * *

UNITED STATES PATENT AND TRADEMARK OFFICE
CERTIFICATE OF CORRECTION

PATENT NO. : 6,173,372 B1
DATED : January 9, 2001
INVENTOR(S) : John S. Rhoades

It is certified that error appears in the above-identified patent and that said Letters Patent is hereby corrected as shown below:

<u>Title page,</u>
Item [75] Inventor "John R. Rhoades" should be -- John S. Rhoades --.

Signed and Sealed this

Twenty-eighth Day of August, 2001

Attest:

*Nicholas P. Godici*

NICHOLAS P. GODICI
*Attesting Officer*     *Acting Director of the United States Patent and Trademark Office*